United States Patent [19]

Tai

[11] Patent Number: 5,064,224

[45] Date of Patent: *Nov. 12, 1991

[54] OIL FIELD TUBULAR CONNECTION

[75] Inventor: Wen-Tong Tai, Houston, Tex.

[73] Assignee: Baroid Technology, Inc., Houston, Tex.

[*] Notice: The portion of the term of this patent subsequent to Aug. 7, 2007 has been disclaimed.

[21] Appl. No.: 480,804

[22] Filed: Feb. 16, 1990

Related U.S. Application Data

[63] Continuation of Ser. No. 320,718, Mar. 8, 1989, Pat. No. 4,946,201.

[51] Int. Cl.$^5$ .............................................. F16L 25/00
[52] U.S. Cl. ....................................... 285/94; 285/334
[58] Field of Search ............... 285/333, 334, 355, 390, 285/94, 332.2, 332.3, 917

[56] References Cited

U.S. PATENT DOCUMENTS

| | | |
|---|---|---|
| 3,047,316 | 7/1962 | Wehring . |
| 3,054,628 | 9/1962 | Hardy et al. . |
| 3,489,437 | 1/1970 | Duret . |
| 3,508,771 | 4/1970 | Duret . |
| 3,822,902 | 6/1975 | Maurer et al. . |
| 3,850,461 | 2/1975 | Fujioka et al. . |
| 3,856,337 | 3/1975 | Ehm et al. . |
| 3,870,351 | 4/1975 | Matsuki . |
| 3,880,451 | 5/1975 | Kinzbach . |
| 3,989,284 | 10/1976 | Blose . |
| 4,192,533 | 3/1980 | Blose . |
| 4,433,862 | 2/1984 | Raulins ........................... 285/334 X |
| 4,548,431 | 10/1985 | Hall ................................. 285/334 |
| 4,601,491 | 7/1986 | Bell .................................. 285/334 X |
| 4,750,761 | 6/1988 | Watts ............................... 285/94 X |
| 4,770,444 | 9/1988 | Hauk ............................... 285/333 X |

FOREIGN PATENT DOCUMENTS

| | | | |
|---|---|---|---|
| 0723054 | 12/1965 | Canada ................................ | 285/334 |
| 0863785 | 2/1971 | Canada ................................ | 285/334 |
| 2438387 | 2/1976 | Fed. Rep. of Germany ...... | 285/333 |
| 0513952 | 6/1956 | Italy .................................... | 285/94 |
| 560965 | 6/1977 | U.S.S.R. ............................. | 285/333 |
| 0800348 | 8/1958 | United Kingdom ................ | 285/333 |

OTHER PUBLICATIONS

World Oil's 1986 Tubing Tables, Jan. 1986, pp. 41 and 50, Gulf Publishing Co.
NL Atlas Bradford General Catalog, 45 pages, Copyright 1987, "Bearing and Lubricants", *Machine Design*, Oct. 13, 1988, pp. 127–189.
"Super Premium (SPC) and Deep Sour Gas (DSGC) Threaded Connection Development", H. J. Dunham and Others, 1982.
Internal Patent Disclosure NL-5481, "Optimized Threaded Connections for Deeper and/or Higher Pressure Sour Gas Wells", Dec., 1982, H. J. Dunham.

*Primary Examiner*—Dave W. Arola
*Attorney, Agent, or Firm*—Browning, Bushman, Anderson & Brookhart

[57] ABSTRACT

An oil field tubular connection is provided for joining metallic tubulars at a well site. At least one end of each tubular is provided with a frustoconical external sealing surface for metal-to-metal sealing engagement with a corresponding surface of an adjoining tubular. A plurality of antigalling grooves provided along the external sealing surface each project radially inward thereof and circumferentially encircle the threaded end of the tubular member and seal the groove from fluid communication with the interior of the tubular member. The antigalling grooves are particularly well suited for use with a low angular taper sealing surface of less than approximately 7°, and reduce galling between the metal sealing surfaces during makeup of the connection. Each tubular connection may also include an energizing groove spaced axially between the exterior sealing surface and the threads on the tubular member. The energizing groove receives excess thread lubricant, and has a uniform radial depth circumferentially about the tubular member for reducing the cross-sectional thickness of the tubular member, thereby allowing the exterior sealing surface to move radially outward in response to increased tubing pressure and allowing more flexibility for increased interference between the sealing surfaces during makeup of the connection.

13 Claims, 2 Drawing Sheets

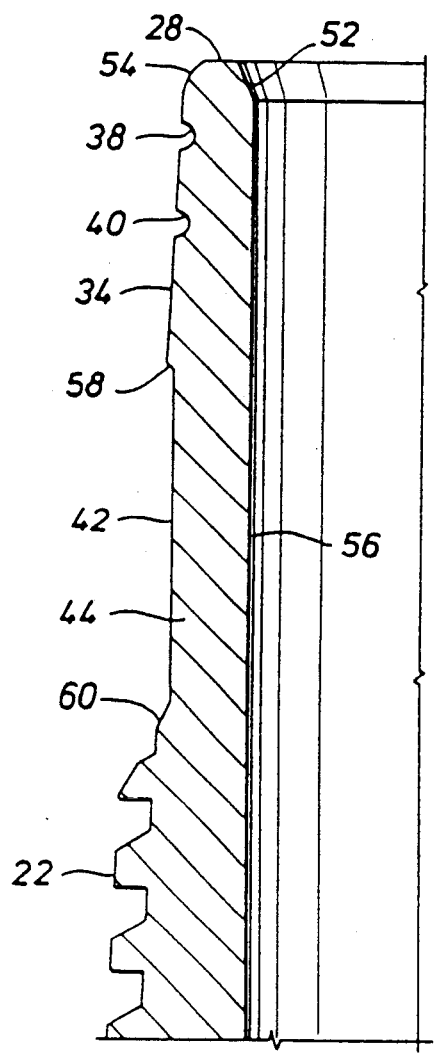
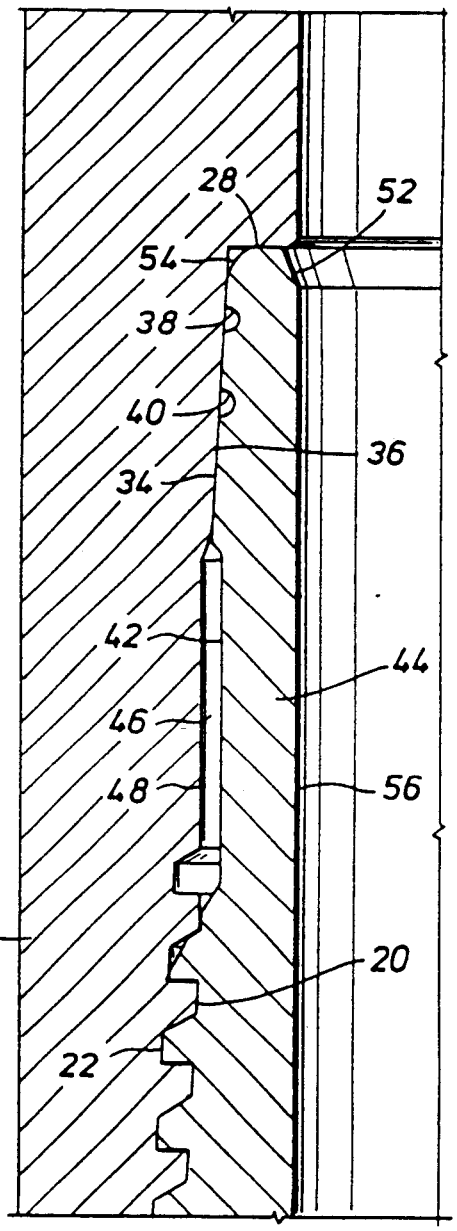
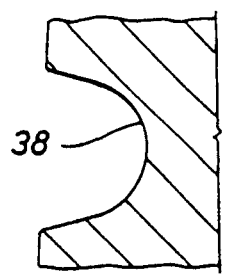
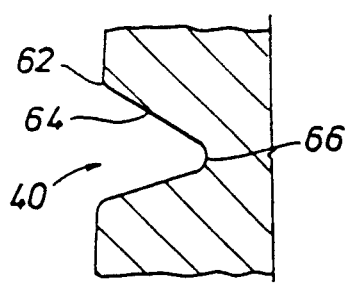

OIL FIELD TUBULAR CONNECTION

This is a continuation of application Ser. No. 07/320,718, filed Mar. 8, 1989 now U.S. Pat. No. 4,946,201 issued Aug. 7, 1990.

BACKGROUND OF THE INVENTION

1. Field of the Invention

The present invention relates to oil field tubulars having conical sealing surfaces for metal-to-metal sealing and, more particularly, relates to an improved oil field tubular connection with conical metal sealing surfaces for reduced galling and improved high pressure sealing.

2. Description of the Background

In equipment designed for rotation of one component about another component, grooves have heretofore been used to obtain pressurized lubrication of the sliding surface and thus reduce friction. For example, it is known in machine equipment design to provide a shaft with grooves in the location where the shaft must rotate within a bore of a machine block. In order to reduce friction, grooves are provided in the shaft so that the pressurized lubricant will flow through these grooves and reduce friction between the sliding surfaces. Accordingly, it is desired that these grooves be both interconnected and open to the pressurized lubricant source, i.e. fluid communication along the length of the grooves or between the grooves is intended, so that pressurized fluid can flow through all of the grooves and thus reduce friction. Alternatively, grooves have been provided in the machine block so that the portion of the shaft which rides on the internal surface of the machine block is lubricated.

Oil field tubulars, including casing, drill pipe and tubing, are conventionally supplied in 40-foot lengths with threaded ends. The tubular ends are fixedly joined together, either by a coupling or a pin-to-box connection, to form a tubular string for lowering into the wellbore. Fluid separation between the interior and exterior of the tubular is required, and accordingly, the tubular ends are conventionally provided with one or more metal surfaces for forming a static seal with a similar surface on the adjacent tubular or interconnected coupling. These tubulars are typically connected by a high torque force, and significant axial loads are conventionally applied to each connection, e.g. from the weight of the tubular string. The metal-to-metal sealing surfaces between the tubular lengths are most commonly frustoconical in configuration. High angle tapered sealing surfaces, e.g. above 15°, are susceptible to leakage when axially directed forces are increased, while relatively long, low angle tapered sealing surfaces of 8° or less are susceptible to galling during the makeup operation.

The conically-shaped metal-to-metal sealing surfaces of the oil field tubulars have conventionally been machined with a relatively smooth surface texture, and the cutting tool radius and feed rate for the machining operation accordingly had been controlled to achieve the desired "smooth" surface finish. Machining grooves on the sealing surfaces generally resulting from high feed rates have generally been considered as stress risers which were likely to cause undesirable galling during connection of the tubular lengths, and thus have been avoided.

Improved techniques are required for forming a reliable metal-to-metal seal between conically-shaped metal surfaces for static sealing in oil field tubular goods. In particular, undesirable galling between metal-to-metal surfaces during makeup and re-makeup of the oilfield tubular connections is a significant problem, especially for relatively long, low angle sealing surfaces. Often these metal-to-metal surfaces produce a desired seal when first madeup, but this metal seal must be broken during repeated "tripping" operations, and the subsequently made up seal is increasingly susceptible to galling, which significantly decreases sealing reliability.

Some oil field tubulars are provided with one or more elastomeric seals for enhancing sealing reliability. A tubular with such a primary seal is not, however, generally used over a wide range of temperature/pressure conditions or downhole fluids, since the effectiveness of the elastomer is highly susceptible to changing downhole conditions. Also, the cost of the tubular is increased to accommodate such seals, elastomeric seals are generally not reusable during repeated makeup operations, and tripping time is increased when primary elastomeric seals must be checked before each use.

Another disadvantage of conventional oil field tubulars concerns decreased sealing effectiveness of low angle metal-to-metal seals under high internal tubular pressure. The lubricant commonly used to makeup the tubular threads may be forced under high pressure from the thread grooves to the tapered sealing surfaces, thereby generating sufficient force to drive the conical sealing surfaces radially apart so that leakage may subsequently result when internal tubular pressure is increased. Proposals to remove this pressure buildup by venting the excess thread lubricant to the interior of the tubular include mechanisms for one-way flow of this pressure, but such mechanisms are expensive and generally considered unreliable. Proposals for reducing this pressure buildup by providing a two-way port between the interior of the tubular and the thread can adequately achieve low cost venting of the thread lubricant, but also result in increased fluid pressure to drive the metal-to-metal surfaces radially apart when tubing pressure increases.

Still another problem with oil field tubulars concerns the design of the tubular connection to properly balance the static and dynamic forces acting on the sealing surfaces. At the pin end of the tubular where the metal sealing surface is generally located, the tubular material radially inward of the sealing surface comparatively thin. Accordingly, sufficient structural integrity of the tubular may be lacking to prevent internal fluid pressure from driving this thin section radially inward and breaking the seal. On the other hand, if this section is comparatively thick, the threads and/or the metal seal on the box end of the tubular might not be able to withstand the high stresses and failure of the joint or leakage of the seal may result. In the event both the pin and box members are thick, the interference pressure, i.e. the pressure caused by mechanical interference between the metal-to-metal sealing surfaces on the pin and the box during makeup, may be too high, which will likely cause undesirable adhesive wearing or galling between these surfaces.

The disadvantages of the prior art are overcome by the present invention, and improved methods and apparatus are hereinafter disclosed for providing a metal-to-metal seal between similarly-shaped conical sealing surfaces of oil field tubular goods, and for improving sealing reliability of such goods under high internal tubular pressure.

SUMMARY OF THE INVENTION

The improved oil field tubular connection of the present invention provides a reliable high pressure metal-to-metal seal between similarly-shaped conical surfaces on respective surfaces of the tubular connection. In a suitable embodiment, the connection includes a low angle conical sealing surface on the pin end of an oil field tubular, and a similarly shaped sealing surface on the box end of another tubular. The likelihood of galling between the sealing surfaces, both during the initial makeup of the connection and during subsequent makeup after tripping operations, is substantially minimized by providing a plurality of circumferential non-intersecting grooves axially spaced along the pin sealing surface. Each groove is sealed from interior tubing pressure, and preferably is a closed loop groove at a constant axial location to reduce manufacturing costs. The local yield relieving grooves or antigalling grooves substantially reduce the likelihood of galling along the relatively long sealing surface by providing lubricant to the contacting surfaces during the spiralling makeup operation, and by providing a relief or receptacle for receiving metal from "peaks" on these sealing surfaces which "flows" into the grooves.

As a further feature of the present invention, the connection may also include a pressure energizing groove axially spaced between the metal-to-metal sealing surfaces and the threads. This energizing groove is also preferably provided on only the pin end of the connection, and serves a dual purpose of providing a cavity to receive thread lubricant, and providing a relatively long, slightly thinner wall portion to the pin end of the connection axially between the threads and the metal-to-metal seal to allow increased tubing pressure to increase the sealing effectiveness of the metal-to-metal seal. Excess lubricant on the threads is thus prevented during the connection makeup from subsequently increasing the radial pressure between the metal-to-metal sealing surfaces, thereby increasing sealing reliability. Moreover, as interior tubing pressure increases, the thinner wall section of the pin created by the energizing groove allows safe radially outward flexure of the metal sealing surface on the pin to form a better, more reliable metal seal.

The antigalling groove and the energizing groove provided in the oil field connection according to the present invention may be used independently of each other, but may conveniently be used in combination to overcome several significant problems with prior art connections. It should also be understood that the concepts of the present invention may be used on either a pin and box connection as described above, or on a connection which includes pin ends of adjacent tubulars and an intermediate coupling.

It is an object of the present invention to provide an improved oil field tubular connection containing conical metal-to-metal primary sealing surfaces which are not susceptible to galling during makeup of the connection.

It is a further object of the present invention to provide a reliable oil field tubular connection which maintains a fluid-tight metal-to-metal seal as internal tubular pressure increases sufficiently compared to annular pressure.

It is a feature of the present invention that the threaded connection of the oil field tubular may be made up with pipe thread lubricant which does not force the metal-to-metal sealing surfaces radially apart.

It is another feature of the invention that the connection may be reliably madeup during repeated tripping operations without modifying the seals or sealing surfaces.

It is an advantage that the oil field tubular according to the present invention does not require elastomeric seals, and is capable of use in various types of downhole environments.

It is a further advantage that the threaded connection is cost-effective to manufacture, and that existing oil field tubular connections may be easily modified to include the concepts of the present invention.

BRIEF DESCRIPTION OF THE DRAWINGS

FIG. 2 is an enlarged cross-sectional view of a portion of the connection shown in FIG. 1.

FIG. 3 is an enlarged cross-sectional view of the antigalling groove shown in FIG. 2.

FIG. 4 is an enlarged cross-sectional view of another embodiment of an antigalling groove for use in the pin end of an oil field tubular connection.

FIG. 5 is an enlarged cross-sectional view of a portion of a connection according to the present invention.

DETAILED DESCRIPTION OF PREFERRED EMBODIMENTS

Figure 1:
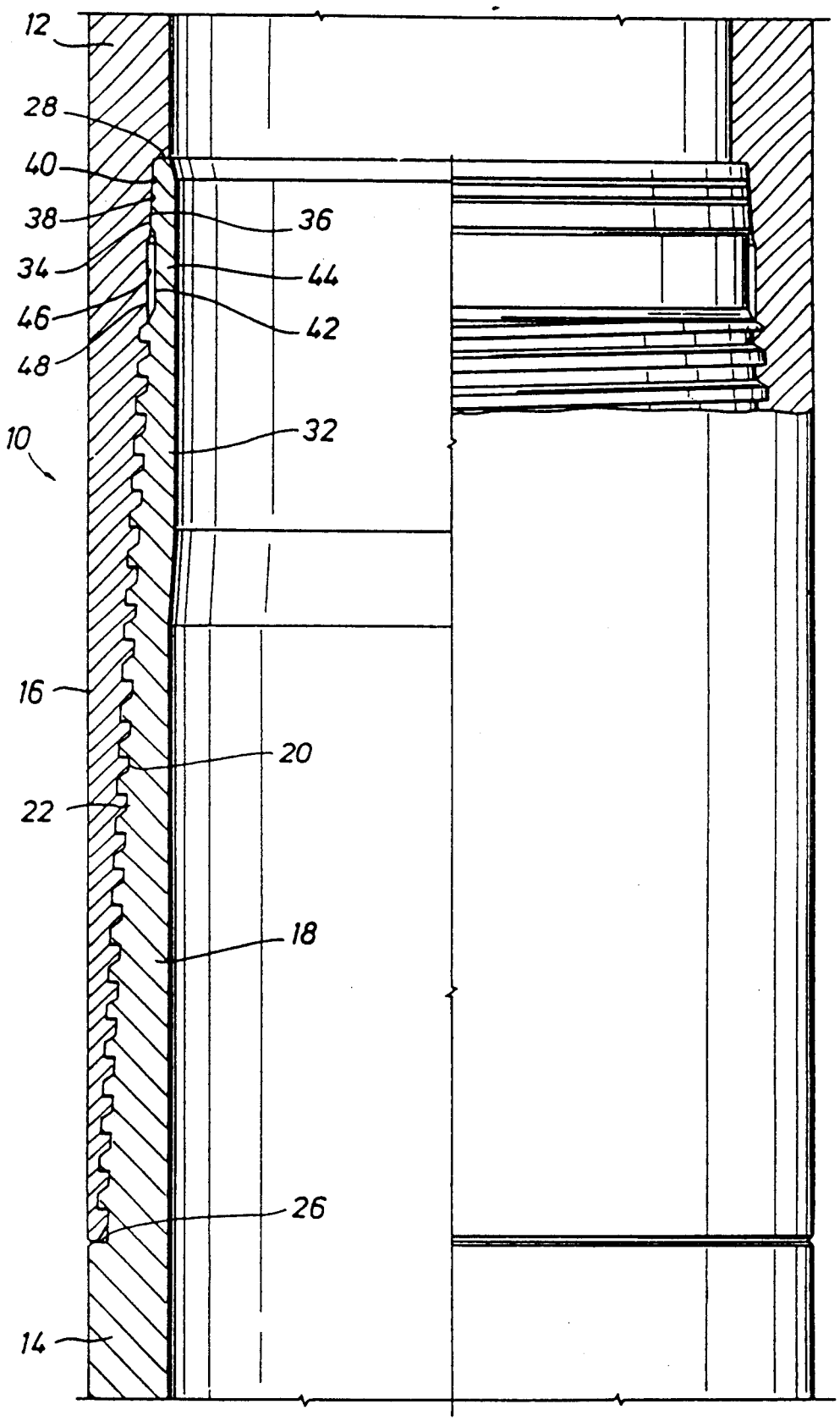
FIG. 1 is a half-sectional view of an oil field tubular connection in accordance with the present invention.

FIG. 1 depicts a tubular connection according to the present invention for joining lengths of oil field tubular members, such as pipe, casing, tubing, etc. each having a tubular body and a flow path interior thereof and about a tubular axis. These lengths of tubular members are joined at a well site for conventional drilling and/or hydrocarbon recovery operations, and each tubular member is provided with threaded ends for structurally connecting the tubulars coaxially to form a tubular string. The present invention is particularly well-suited for joining lengths of tubulars with a conventional box end of one tubular threaded to a pin end of another tubular, although the present invention may also be used to joint adjacent threaded ends of tubulars using a short coupling. Accordingly, the term "tubular" as used herein is intended to include both elongate tubular members, as described above, and comparatively short couplings which interconnect elongate tubulars.

The oil field connection 10 as shown in FIG. 1 is thus made up at the well site by threading the box end 16 of tubular 12 with the pin end 18 of tubular 14. Each tubular member is thus provided with mating threads 20 and 22, respectively, for forming the interconnection. While various types of threads may be used for forming this interconnection, a preferred connection thread is according to the Atlas Bradford thread design, which has a negative 7° load flank and a 25° stab flank. Conventional oil field tubular torquing lubricant is typically applied to one or both of the threads to facilitate the makeup or subsequent break out operation.

Both the box end 16 of the tubular 12 and the pin end 18 of the tubular 14 are provided with a torque end surface 26, 28 respectively at their axially extreme ends for engaging corresponding surfaces 27, 29 on the other tubular member. Each of the surfaces 26, 27, 28 and 29 preferably lie in a substantially radial plane perpendicular to the tubular axis, and limits torqued rotation of one tubular with respect to the other tubular during the makeup operation. The interior flow path of the tubular members are aligned, and each tubular has a nominal diameter flow path defined by cylindrical surfaces 30 as shown. The pin end 18 of tubular 14 may be upset radially inward slightly, so that a relatively short length 32 of the pin end between the torque end surface 28 and extending continually past a plurality of threads 22 has a slightly reduced diameter cylindrical flow path defined by surface 33.

Axially located between the torque shoulder formed by surfaces 28 and 29 and the threads 20 and 22 is a metal-to-metal seal comprised of tapered surface 34 on the pin end and corresponding tapered surface 36 on the box end. As used herein, the term "metal-to-metal seal" is used in its conventional sense, and includes a seal which has a thin film of oil, grease, etc. between the metal surfaces themselves to enhance sealing effectiveness. Each tapered surface has a frustro-conical configuration, and preferably has a relatively low angle taper of less than approximately 7° with respect to the axis or centerline 24 of its tubular member. The pin end includes a plurality of circumferential antigalling grooves 38, 40 formed radially inward of the sealing surface 34, as shown. An energizing groove is preferably provided axially between the metal-to-metal sealing surfaces 34, 36 and the threads 20, 22 and is formed by a circumferential, relatively axially long and radially shallow groove surface 42 in the pin end 18 of the tubular. Accordingly, a gap 46 is formed between the groove surface 42 and its radially opposing surface 48 on the box end of the tubular. Both the antigalling grooves and the energizing grooves are discussed in detail below.

FIG. 2 depicts in greater detail a cross-sectional view of the pin end of a tubular member according to the present invention. A rounded exterior corner 54 joins planar end surface 28 with sealing surface 34, and surface 28 is similarly joined to interior cylindrical surface 33 by tapered interior surface 52. The conical sealing surface 34 typically extends axially from the end surface 28 or corner 54 a distance of approximately ⅜ to ⅝ of an inch. A plurality of antigalling grooves 38, 40 each extend radially inward from surface 34, and may be spaced axially at any selected location along the surface 34, although preferably the antigalling grooves are spaced axially apart from each other and from the corresponding axial ends of surface 34 approximately the same amount.

FIG. 3 depicts a substantially a U-shaped groove 38 in greater detail. FIG. 4 depicts a substantially V-shaped groove 40, which is formed by opposing tapered wall surfaces 64 which are angled apart approximately 35° from each other, and a curved tipped end surface 66. The radially outward edges of each groove are preferably slightly rounded at 62 to join the sealing surface 34. Each of the grooves 38, 40 preferably has a uniform radial depth in the range of from 0.014″ to 0.024″ from its adjoining exterior surface 34. Also, the axial length or height of each of the grooves 38, 40 is preferably from about one to about three times its radial depth. As previously noted and as shown in FIG. 1, each groove circumferentially encircles the pin end of the tubular, and lies within a radial plane perpendicular to the tubular axis to minimize manufacturing costs.

As the tapered sealing surfaces spiral relative to each other during the makeup operation, it has been found that galling between these surfaces can be substantially minimized by providing grooves 38, 40. Galling is particularly a problem when making up a relatively low angled tapered metal-to-metal seal of less than 7°, since the axial length of the surfaces typically increases to accommodate the lower angle taper. Although the reasons for the improved performance resulting from the antigalling grooves is not fully known or quantified, it is believed that the grooves serve as a circumferential reservoir for receiving excess thread lubricant during the makeup operation. In effect, lubricant that flows into these grooves during the makeup operation intermittently wets the sliding surfaces 34, 36 during makeup or break out of the threaded connection. Also, the lubricant in the grooves 38, 40 dissipates heat generated by the sliding surfaces 34, 36 during the makeup operation more effectively than does the metal of either the pin or box ends, thereby further reducing the galling tendency. Moreover, the bearing contact area of the metal-to-metal seal between surfaces 34 and 36 is reduced as a function of the number and axial height of the grooves, thereby increasing the sealing pressure and sealing effectiveness of these surfaces by reducing the sealing area.

The grooves 38, 40 also provide a reservoir for receiving "excess metal" on the surfaces 34, 36 caused by the makeup operation, thereby increasing sealing effectiveness by allowing metal on the sealing surface which might otherwise prevent the desired metal-to-metal seal to flow into the grooves. It has been found that in order to form the desired seal, a continuous band of contact between these metal surfaces is necessary, and the minimum contact pressure holding these surfaces together must be greater than the internal pressure in the tubular since this interior tubular pressure is tending to drive these surfaces apart. Due to vibration inherent in the process of machining these surfaces 34, 36, perfectly "flat" sealing surfaces are not possible using economical manufacturing techniques, and the "peaks" in these surfaces will carry most of the load and prevent the "valleys" from actually contacting and thereby assisting in transmitting the necessary contact pressure. The grooves 38, 40 provide a relief or reservoir which allows the metal forming the "hills" on the surfaces 34, 36 to "flow" by cold forming into a groove during makeup, and thereby form a more uniform flat surface for increasing the contact area between these sealing surfaces.

FIG. 2 also depicts in greater detail the energizing groove formed by the surface 42 which extends axially between the sealing surface 34 and the threads 22. This energizing groove is typically joined to the sealing surface 34 by a tapered surface 58, and is similarly joined to the threads by an opposing tapered surface 60. The energizing groove is formed along a relatively long portion 44 of the pin end which extends over an axial length of at least three percent, and preferably about five or six percent, of the nominal diameter of the tubular connection. By way of illustration, the energizing groove according to the present invention has a length of at least ¼″, and preferably about ⅝″, for drill pipe having an 11¾″ nominal diameter. The energizing groove formed by surface 42 is, however, relatively shallow, and preferably has an axial depth of less than about 0.030 inches, and preferably less than about 0.020 inches, with respect to the lowermost portion 43 of the sealing surface 34 axially closest to the threads 22. Stated differently, the axial depth of the energizing groove is less than about 5%, and preferably less than about 3%, of the axial length of the energizing groove with respect to the maximum diameter of the tapered sealing surface.

Another oil field tubular connection according to the present invention is depicted in FIG. 5. The connection as shown in FIG. 5 is similar to the connection shown in FIG. 1, except that the pin end of the tubular is threaded to a relatively short oil field coupling having internal threads at each end, so that each end of the coupling is substantially similar to the box end 16 previously discussed. Also, the internal cylindrical surface 56 on the pin end of the tubular has a diameter corresponding to the internal diameter of both the coupling and the remaining axial length of the tubular. FIG. 5 thus depicts in greater detail the energizing grooves 38, 40 radially inward of the sealing surface 34 and positioned with respect to sealing surface 36 for the made up connection.

The purpose of the energizing groove 46 will now be discussed with respect to FIG. 5. As the threads 20 and 22 are made up, excess lubricant on the threads is allowed to flow into the energizing groove 46, and thus does not exert a radial fluid force between the sealing surfaces 34 and 36 tending to break apart the metal-to-metal seal. Also, the reduced cross-sectional thickness of portion 44 of the pin end of the tubular allows radially outward flexing of the sealing surface 34 in response to increased interior pressure in the tubular member. This flexing effect can be appreciated by those skilled in the art, who understand that the internal tubular pressure can exceed the external tubular pressure by 5000 psi or more. Accordingly, this flexing allows the sealing surface 36 to move radially outward to maintain the desired seal.

A delicate balance must be maintained, however, in the design of the energizing groove as explained above. If the radial depth of the groove is too great and the cross section of the portion 44 is too thin, portion 44 itself may bow inward into the groove 46 in response to the increased tubular pressure, thereby undesirably tending to move the sealing surface 34 radially inward. Also, if the axial length of the energizing groove is too short, the desired inward flexing of the sealing surface 34 is not obtained, and/or insufficient room is provided to receive the excess thread lubricant. When the threaded connection is made up at the rig site, the box end radially outward of the sealing surface 36 preferably is in tension, while the pin end radially inward of sealing surface 34 preferably is in compression. As the connection is lowered into the well bore and interior tubular pressure increases over exterior (annular) tubular pressure, the compressive force on the pin end will decrease as both the pin and box portions respond to the increased pressure differential. Preferably, the pin end remains at least slightly in compression, however, and does not "pass" into tension, at least for an internal tubing pressure at or less than the rated pressure of the tubular.

By providing a relatively low angle tapered sealing surface, the metal-to-metal seal between surfaces 34 and 36 may be maintained even though a high axial load is applied to the tubular string. Both the antigalling grooves and the energizing groove are preferably formed on the pin end of a tubular connection, so that each of these grooves can be machined in a cost-effective manner and easily checked. As previously noted, both the antigalling grooves and the energizing groove circumferentially encircle the pin end of each tubular member, and each groove is axially centered along a radial plane perpendicular to the central axis of the pin end of the tubular member. Although only two antigalling grooves are shown and discussed herein, it should be understood that additional antigalling grooves may be provided along the axial length of the pin end sealing surface. Each of the antigalling grooves is sealed from the interior tubing pressure by the metal-to-metal seal formed by the surfaces 34 and 36, and accordingly a spiralling groove which extended to the tip end of the pin member and was not reliably sealed from the interior tubing pressure should be avoided. A spiralling or meandering antigalling groove could, however, be provided as long as the groove fully encircled the pin end of the tubular member and was reliably sealed from interior tubing pressure.

The foregoing disclosure and description of the invention is illustrative and explanatory thereof, and various changes in the details of the connection may be made in the scope of the appended claims without departing from the spirit of the invention.

What is claimed is:

1. An oil field tubular connection for coaxially joining lengths of tubular members at a well site, each tubular member having a tubular body and a flow path interior of the tubular body for transmitting high pressure fluids along a tubular axis through joined tubular members, the tubular connection comprising:
    a box member having a box end terminal surface, internal threads along an inner periphery thereof, and a frustoconical metal interior sealing surface spaced axially opposite the box end terminal surface with respect to the internal threads;
    a pin member having a pin end terminal surface, external threads along an outer periphery thereof for mating engagement with the internal threads of the box member, and a frustoconical metal exterior sealing surface spaced axially between the external threads and the pin end terminal surface for fluid-tight sealing engagement with the interior sealing surface on the box member to seal the mated threads from the high pressure fluids within the joined tubular members; and
    an antigalling groove spaced axially along the frustoconical exterior sealing surface of the pin member and projecting radially inward thereof, the antigalling groove circumferentially encircling the exterior sealing surface within a common plane perpendicular to the tubular axis and sealed from the high pressure fluids by sealing engagement of the box member sealing surface and pin member sealing surface.

2. The oil field tubular connection as defined in claim 1, further comprising:
    a plurality of axially spaced antigalling grooves each circumferentially encircling the exterior sealing surface within a plane perpendicular to the tubular axis.

3. The oil field tubular connection as defined in claim 1, wherein each frustoconical sealing surface on the pin member and the box member has an angular taper of less than 7° with respect to the tubular axis.

4. The oil field tubular connection as defined in claim 1, wherein the antigalling groove has a radial depth in the range of from 0.014 inches to 0.024 inches from an adjoining portion of the exterior sealing surface, and has an axial length of from one to three times its radial depth.

5. The oil field tubular connection as defined in claim 1, wherein the pin end terminal surface is a torque end surface adapted for engagement with a stop surface on the box member to limit torqued rotation of the pin member with respect to the box member.

6. The oil field tubular connection as defined in claim 5, wherein the torque end surface is perpendicular to the tubular axis.

7. A pin member for mated engagement with a box member having internal threads and a frustoconical metal interior sealing surface, the mated pin member and box member forming an oil field tubular connection for sealingly transmitting pressurized fluids through tubular members along a tubular axis, the pin member comprising:
   a pin end terminal surface;
   external threads along an outer periphery of the pin member for mated engagement with the internal threads on the box member;
   a frustoconical metal exterior sealing surface spaced axially between the external threads and the pin end terminal surface for metal-to-metal fluid-tight sealing engagement with the interior sealing surface on the box member; and
   an antigalling groove spaced axially along the frustoconical exterior sealing surface of the pin member and projecting radially inward thereof, the antigalling groove circumferentially encircling the exterior sealing surface within a common plane perpendicular to the tubular axis.

8. The pin member as defined in claim 7, further comprising:
   a plurality of axially spaced antigalling grooves each circumferentially encircling the exterior sealing surface of the pin member within a plane perpendicular to the tubular axis.

9. The pin member as defined in claim 7, wherein the frustoconical exterior sealing surface of the pin member has an angular taper of less than 7° with respect to the tubular axis.

10. A pin member as defined in claim 7, wherein the antigalling groove has a radial depth in the range from 0.014 inches to 0.024 inches from an adjoining portion of the exterior sealing surface, and has an axial length of from one to three times its radial depth.

11. A pin member as defined in claim 7, wherein the pin end terminal surface is a torque end surface lying within a plane perpendicular to the tubular axis for limiting torqued rotation of the pin member with respect to the box member.

12. A pin member for mated engagement with a box member having tapered threads and a frustoconical interior sealing surface to form an oil field tubular connection, a pin member comprising:
   a pin end terminal surface;
   tapered external threads along an outer periphery of the pin member for mated engagement with the internal threads on the box member;
   a frustoconical exterior sealing surface spaced axially between the external threads and the pin end terminal surface for fluid-tight sealing engagement with the interior sealing surface on the box member; and
   an energizing groove spaced axially between the exterior sealing surface on the pin member and the external tapered threads on the pin member, the energizing groove projecting radially inward of a lowermost portion of the exterior sealing surface on the pin member spaced axially closer to the external threads than all other portions of the exterior sealing surface, the energizing groove having a radial depth circumferentially about the pin member for reducing the cross-sectional thickness of an adjoining portion of the pin member over an axial length of at least 3% of the nominal diameter of the pin member, the radial depth of the energizing groove being less than 5% of the axial length of the energizing groove, such that fluid pressure internal of the tubular connection forces the exterior sealing surface of the pin member radially outward by flexing the pin member at a location along the axial length of the energizing groove to increase sealing effectiveness between the exterior sealing surface of the pin member and interior sealing surface of the box member.

13. The pin member as defined in claim 12, wherein the pin end terminal surface is a torque end surface lying substantially in a plane perpendicular to the tubular axis of the pin member for limiting torqued rotation of the pin member with respect to the box member.

* * * * *